(12) United States Patent
Ißler

(10) Patent No.: US 10,224,648 B2
(45) Date of Patent: Mar. 5, 2019

(54) SLEEVE, CONTACTING DEVICE AND METHOD FOR WELDING THIN, STRANDED CONDUCTORS BY ULTRASONIC WELDING

(71) Applicant: GENTHERM GMBH, Odelzhausen (DE)

(72) Inventor: Markus Ißler, Gersthofen (DE)

(73) Assignee: GENTHERM GMBH, Odelzhausen (DE)

( * ) Notice: Subject to any disclaimer, the term of this patent is extended or adjusted under 35 U.S.C. 154(b) by 0 days.

(21) Appl. No.: 15/053,006

(22) Filed: Feb. 25, 2016

(65) Prior Publication Data

US 2016/0254602 A1 Sep. 1, 2016

(30) Foreign Application Priority Data

Feb. 27, 2015 (DE) .................. 10 2015 002 489
Oct. 7, 2015 (DE) .................. 10 2015 012 906

(51) Int. Cl.
*H01R 4/02* (2006.01)
*H01R 4/18* (2006.01)

(52) U.S. Cl.
CPC .................. *H01R 4/187* (2013.01)

(58) Field of Classification Search
CPC ........................................ H01R 4/20
USPC .............................. 174/84 C, 251
See application file for complete search history.

(56) References Cited

U.S. PATENT DOCUMENTS

| | | | |
|---|---|---|---|
| 3,336,561 A * | 8/1967 | Whiting | H01R 11/12 439/55 |
| 3,656,092 A * | 4/1972 | Swengel, Sr. | H01R 4/723 439/730 |
| 3,895,851 A * | 7/1975 | Bolton | H01R 4/62 174/84 C |
| 3,980,806 A * | 9/1976 | May | H01R 4/20 16/108 |
| 4,161,619 A * | 7/1979 | Markarian | H05B 7/14 373/91 |
| 4,656,339 A | 4/1987 | Grise | |
| 4,661,689 A | 4/1987 | Harrison | |
| 4,829,146 A * | 5/1989 | Duve | H01R 4/20 174/84 C |
| 4,964,674 A | 10/1990 | Altmann et al. | |
| 5,414,241 A | 5/1995 | Ohashi et al. | |
| 5,451,747 A | 9/1995 | Sullivan et al. | |
| 5,961,869 A | 10/1999 | Irgens | |
| 6,229,123 B1 | 5/2001 | Kochman et al. | |
| 6,638,107 B1 * | 10/2003 | Silfverberg | H01R 4/20 439/275 |
| 6,713,733 B2 | 3/2004 | Kochman et al. | |
| 6,909,051 B2 * | 6/2005 | Noble | H01R 43/048 174/251 |
| 6,974,615 B2 * | 12/2005 | Hosaka | H01R 4/024 174/257 |
| 7,714,256 B2 | 5/2010 | Weiss | |

(Continued)

*Primary Examiner* — Chau N Nguyen
(74) *Attorney, Agent, or Firm* — The Dobrusin Law Firm, PC

(57) ABSTRACT

The teachings relate to the improvement of the connection between a stranded conductor and a substrate by using a sleeve for holding the end of the stranded conductor, wherein the end can be crimped to the sleeve and the sleeve can be welded to the substrate via ultrasonic welding or connected thereto by crimping.

19 Claims, 1 Drawing Sheet

(56) References Cited

U.S. PATENT DOCUMENTS

| | | | |
|---|---|---|---|
| 7,828,610 B2 * | 11/2010 | Lehmann | H01R 4/187 |
| | | | 29/860 |
| 8,198,569 B2 | 6/2012 | Krobok et al. | |
| 8,253,071 B2 | 8/2012 | Weiss | |
| 8,288,693 B2 | 10/2012 | Weiss et al. | |
| 8,456,272 B2 | 6/2013 | Rauh et al. | |
| 8,723,043 B2 | 5/2014 | Weiss et al. | |
| 9,241,373 B2 | 1/2016 | Schaeffer et al. | |
| 9,384,872 B2 * | 7/2016 | Wild | H01R 4/029 |
| 2004/0100131 A1 | 5/2004 | Howick | |
| 2009/0151467 A1 | 6/2009 | Heimerl | |
| 2011/0036900 A1 * | 2/2011 | Chen | B21D 39/04 |
| | | | 228/148 |
| 2013/0126147 A1 | 5/2013 | Voros | |
| 2014/0073205 A1 * | 3/2014 | Gery | H01R 4/203 |
| | | | 439/877 |

* cited by examiner

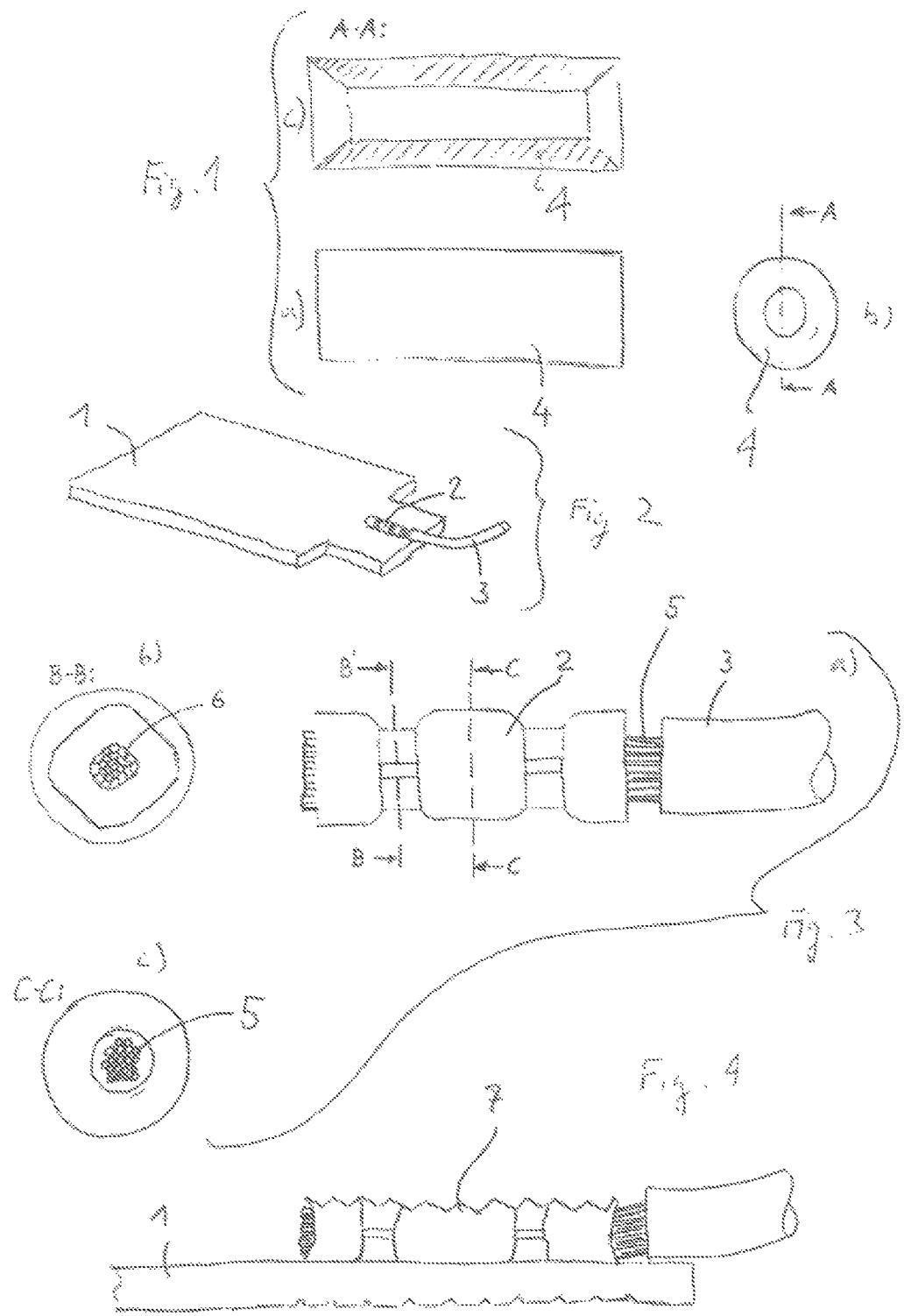

_SLEEVE, CONTACTING DEVICE AND METHOD FOR WELDING THIN, STRANDED CONDUCTORS BY ULTRASONIC WELDING_

FIELD

The subject matter of the present invention relates to a contacting device, a sleeve, an electrical device and a vehicle, in particular a sleeve for holding an end of a stranded conductor for forming a contact for welding to a substrate.

BACKGROUND

Copper leads can be welded to conductive metals using ultrasound technology. In particular, cross-sections greater than 0.5 $mm^2$ can be joined with good pull-off values. Crimping during welding generally results in a weakening of the material and in defined weak points, hampering in particular the welding of cross-sections measuring 0.35 $mm^2$ or less. The reduced pull-off forces make the use of such thin leads impracticable. And compacting prior to welding is only marginally helpful.

To help obtain a larger cross-section, open crimping sleeves are frequently used. The disadvantage here is that the quality of the connection is dependent on the orientation of the crimped geometry on the connecting plate, and the strength of the crimp is generally weakened by the ultrasonic energy, since the crimp sides are merely rolled and can open up again during crimping. Relative movements within the crimp can occur, which can also damage the crimp.

SUMMARY

In light of the above background, a technical concept having a sleeve for holding an end of a stranded conductor for the purpose of forming a contact for welding to a substrate.

The present teachings provide: a contacting device having a substrate and a stranded conductor, wherein the stranded conductor having a sleeve according to any one of the preceding claims is mounted on said substrate, in particular welded by ultrasonic means or crimped, and the conductor is preferably crimped to the sleeve.

The present teachings provide: a method for connecting a stranded electric conductor to a substrate for producing a contacting device according to the teachings herein, having the following method steps: (a) inserting the stranded electric conductor into a sleeve according to the teachings herein, (b) first crimping the sleeve to the conductor, thereby fastening the electric conductor in the sleeve, (c) placing the conductor with the sleeve on the substrate, (d) connecting the sleeve which encompasses the conductor to the substrate by ultrasonic welding and/or by a second crimping.

The present teachings provide: a vehicle having a contacting device according to the teachings here, in particular a battery according to the teachings herein.

The present teachings provide: a use of a sleeve according to the teachings herein for a contacting device according to the teachings herein or for a method according to the teachings herein or for a battery according to the teachings herein or for a vehicle according to the teachings herein.

The present teachings relate in particular to a sleeve 4 for holding the end of a stranded conductor 3, for the purpose of forming a contact for welding to a substrate 1.

In this process, it is particularly desirable for sleeve 4 to be closed at least locally a full 360° around the circumference of conductor 5. This serves to protect the boundary zones of the contact point against corrosion.

It is advantageous for at least one plug-in opening for inserting stranded conductor 5 to have a tapered lead-in in the form of a transition, which narrows in the form of a funnel, from the outer diameter of said opening to its inner diameter, to avoid any sharp edges that might compromise the stability of conductor 5, 6.

Defined weak points are avoided in that the tapered lead-in avoids radii of curvature of less than 0.5 mm.

Assembly is simplified in that sleeve 4 has a tapered lead-in at each of its two ends.

Buckling strength is increased in that the overall cross-section of sleeve 4 and conductor 5, 6 is at least 0.5 mm2.

A contacting device having a substrate 1 and a stranded conductor 3 is particularly corrosion-resistant in that stranded conductor 3 having a sleeve 4 according to the invention is mounted on said substrate, in particular welded by ultrasonic means or crimped, with conductor 3 preferably being crimped to sleeve 4.

A contacting device in which crimping is carried out not over the entire length of sleeve 4, but only over a part of the length, and in which sleeve 4 is mounted on substrate 1 over an uncrimped part of the length is more stable.

A contacting device in which the metallic material of the core of conductor 3 and the metallic material of substrate 1 have an electrochemical potential difference of more than 0.3 V, and in which sleeve 4 is made of a metallic material, the electrochemical potential of which lies between that of the core of conductor 3 and that of substrate 1, wherein substrate 1 is preferably made of an aluminum material, the core of conductor 3 is preferably made of a copper material and sleeve 4 is preferably made of a brass material or a CuZn material, enables corrosion problems to be avoided.

Expedient is a method for connecting a stranded electric conductor 3, 5, 6 to a substrate 1 in order to produce a contacting device according to any one of claims 7 to 9, having the following method steps:

a) inserting stranded electric conductor 5 into a sleeve 4 according to any one of claims 1 to 6, b) first crimping sleeve 4 to conductor 5, thereby fastening electric conductor 6 in sleeve 4, c) placing conductor 5 with sleeve 4 on substrate 1, d) connecting sleeve 4, which encompasses conductor 5, to substrate 1 by ultrasonic welding and/or by a second crimping.

Such a method is particularly beneficial if the first crimping is carried out over only a part of the length, rather than over the entire length, so that the connection between sleeve 4 and substrate 1 is established only in the uncrimped region of the sleeve.

Such a method in which, in its uncrimped state, sleeve 4 has a rotationally symmetrical cross-section, and remains rotationally symmetrical at least in sections even after crimping, improves the weldability of the resulting sleeve.

A battery having such a contacting device, in particular having a substrate 1 made of an aluminum material, is reliably protected against corrosion.

A vehicle having such a contacting device, in particular a battery according to the invention, is advantageous.

The use of a sleeve 4 according to the invention for a contacting device or for a corresponding method, for a battery or for a vehicle will produce the stated advantages.

The same applies to the use of a contacting device for a method, for a battery or for a vehicle.

BRIEF DESCRIPTION OF THE DRAWINGS

In the following, details of the invention will be specified. These statements are intended to elucidate the invention.

However, they are merely exemplary in character. Of course, one or more of the features described may also be omitted, modified or enhanced within the scope of the invention as defined by the independent claims. The features of various embodiments may of course also be combined with one another. What is critical is that the concept of the invention be essentially implemented. Any feature that is said to be at least partially implemented is also considered to be fully or substantially fully implemented. "Substantially" in this context means particularly that the implementation allows the desired use to be achieved to a recognizable degree. This can mean, in particular, that a corresponding feature is at least 50%, 90%, 95% or 99% implemented. If a minimum quantity is indicated, more than said minimum quantity may of course be used. If the number of a component is given as at least one, this naturally also includes embodiments having two, three or some other multiple of components. What is described in relation to one object can also be applied to the majority or the entirety of all other similar objects. Unless otherwise indicated, intervals include their boundary points. "A/an" in the following is intended as an indefinite article and means "at least one". In the following, reference is made to:

FIG. 1 a sleeve for crimping and welding a) in a plan view b) in cross-section c) in longitudinal section FIG. 2 a substrate having a stranded conductor and a sleeve according to the invention in a welded view FIG. 3 a stranded conductor having a sleeve according to FIG. 1 in a partially crimped state a), in a plan view b) and c) in cross-section FIG. 4 a substrate having a stranded conductor and the sleeve according to the invention in a welded view, in enlarged longitudinal section

DETAILED DESCRIPTION

The present teachings relate to a vehicle. The term "vehicle" means particularly a device for transporting persons and/or goods. Possible vehicles include, for example, land, water and rail vehicles, and aircraft, in particular airplanes, ships and automobiles, in particular electric automobiles.

The present teachings further relates to a battery, in particular for a vehicle and preferably for an electric vehicle. The invention may be relevant particularly for the contacting of parts of a battery which are made of an aluminum material, in particular for contacting a contact plate for an elementary cell of a battery. In this process, a sleeve is drawn over a stranded conductor. The sleeve is then partially crimped to connect conductor and sleeve to one another. The sleeve is then welded and/or crimped, along with the conductor, to the substrate.

The advantageous characteristics of the teachings herein are, in particular:

1. that the sleeve is closed, wherein it may be bent from a sheet and provided with an unclosed, slot-type seam, or may also be made, fully closed (in particular welded) or completely seamless, from a raw material; this will prevent it from opening up, or will cause it to open up less, especially during crimping;

2. that the sleeve is rotationally symmetrical and the crimping is performed rotationally symmetrically, or an uncrimped area remains rotationally symmetrical. This serves to ensure that the sleeve can be positioned on the substrate independently of the alignment of said sleeve around the longitudinal axis;

3. that the crimping is performed not over the entire length, but only over a part of the length. As a result, the actual crimping of lead and sleeve is not damaged by the welding process. The uncrimped region of the sleeve can thus be joined to the substrate, e.g. using ultrasound;

4. that at least one tapered lead-in for the lead is provided on the sleeve to avoid sharp edges that might weaken the lead;

5. that two tapered lead-ins are provided on the sleeve, so that it can be processed in an automated process;

6. that the overall cross-section of sleeve and lead is at least 0.35 mm$^2$, preferably at least 0.5 mm$^2$. This is because ultrasonic welding of round conductors is technically difficult below 0.35 mm$^2$, since the mechanical strength (robustness of the connection) becomes very low.

The present concept is suitable particularly for the welding of two metallic components the electrochemical voltage potentials of which differ dramatically, that is by more than 0.3 V, from one another and which are therefore susceptible to problems with contact corrosion. Expediently producing the sleeve from a material which has an electrochemical voltage potential that is between the voltage potentials of the components to be welded allows the potential difference to be skillfully distributed. As a result, susceptibility to corrosion is reduced or even completely eliminated.

Particularly suitable is a welding of aluminum components (e.g. contact plates) having copper cables/wires, using sleeves made of brass or some other alloy containing copper and/or zinc. In this case, it is advantageous for the electrochemical potential of the sleeve material, at least in the area in which the sleeve contacts another component, to be between that of the two components to be contacted. This is preferably between +0.52 V to +0.34 V for copper and approximately −1.66 V for aluminum.

It may also be expedient to produce a sleeve from a "hybrid material", in other words a material having at least two different components that are not intermixed, at least locally. Said components are hermetically sealed so tightly, however, that no contact corrosion can result on the contact surface. For this purpose, the sleeve is preferably embodied as comprising two layers, that is, made of a material having two layers which have different characteristics from one another. These materials may be produced by means of the cold roll bonding method, for example. A first layer is preferably made of soft, electrically conductive material, e.g. copper. Soft in this context means particularly softer than brass. Copper cannot be crimped to copper leads, because it will not produce a retaining force. However, copper can be effectively welded to soft aluminum. A second layer is preferably made of a harder material, e.g. brass. Said material can be crimped, but cannot be welded to soft aluminum with satisfactory results.

Thus the sleeve preferably has, at least in sections, an inner tubular layer of brass. This is encased, at least in sections, in an outer tubular layer of copper.

FIG. 1 shows sleeve 4 according to the invention, specifically in the form of a hollow cylinder having conically widened openings; cf. FIG. 1c). The edges shown at the transition between the conically widened areas and the cylindrical hollow space may also be rounded, to minimize stress on the core of conductor 3 inserted therein. This can also apply to the edges at the outer end of the conically widened area.

It is clear from FIG. 3 that core 5 of a conductor 3 has been inserted into sleeve 4 (FIG. 3c)). In this situation, the rotational symmetry still exists (the individual filaments of core 5 do not count). Sleeve 4 is then partially crimped lengthwise using known crimping pliers, specifically in the two regions indicated in FIG. 3a). These regions are shown in cross-section in FIG. 3b). Core 5 is compressed, and in this compressed state is denoted as 6, and the outer circumference of sleeve 4 in the compressed region has an approximately square shape with rounded corners. Other crimping geometries (hexagonal, four-point, etc.) are also possible. FIG. 3a) shows a view of such a corner (at the center), in which one side of the square is visible thereabove and another therebelow. Otherwise, the sleeve upstream and downstream of the respective compressed regions remains rotationally symmetrical.

This allows the sleeve to be mounted in any position on a contact plate, specifically substrate 1 according to FIG. 2, e.g. by ultrasonic welding or by further crimping. The orientation plays no role since, for this mounting and contacting, only the uncrimped parts of sleeve 4 are essential. FIG. 4 symbolically shows an ultrasonically welded state, in which the upper side of sleeve 4 (denoted as 7 because it has been welded in this case) and the underside of substrate 1 are altered in the known manner as a result of the ultrasonic welding.

The contact plate or substrate 1 can be, e.g. a contact plate made of aluminum material of an elementary cell of a vehicle battery, in particular an electric automobile. Here, due to the electrochemical potential differences, using copper-material cable for contacting particularly results in difficulties, which can be overcome by a suitable selection of the sleeve material.

Furthermore, the invention is very well suited for automated assembly due to the position insensitivity in the joining of sleeve 4 to substrate 1 (rotational symmetry), but also due to the mirror symmetry of sleeve 4 with respect to its conically widened areas (FIG. 1c)).

LIST OF REFERENCE SIGNS 1 substrate as connecting partner (plate)
2 sleeve, crimped
3 electric conductor with insulating jacket
4 sleeve, uncrimped
5 copper core of conductor, uncrimped
6 copper core of conductor, crimped
7 sleeve, crimped and ultrasonically welded

The invention claimed is:

1. A sleeve comprising: two plug-in openings located at opposing ends of the sleeve for inserting a stranded conductor and having a tapered lead-in in a form of a transition at an outer end of the sleeve to initially receive insertion of the stranded conductor into the sleeve, which narrows in a form of a funnel, from an outer diameter to an inner diameter, to avoid any sharp edges that might compromise stability of the stranded conductor;
wherein the sleeve is rotationally symmetrical;
wherein the sleeve is made of brass, an alloy containing copper or zinc, or two layers of different materials;
wherein the sleeve holds an end of the stranded conductor and the sleeve forms a contact that is welded to an aluminum substrate; and
wherein the stranded conductor and the sleeve are compressed in more than one location along a length of the sleeve.

2. The sleeve according to claim 1, wherein the sleeve is closed at least locally a full 360° around a circumference of the stranded conductor.

3. The sleeve according to claim 1, wherein the tapered lead-in avoids radii of curvature of greater than 0 and less than 0.5 mm.

4. The sleeve according to claim 1, wherein an overall cross-section of the sleeve and conductor is at least 0.5 mm$^2$.

5. A contacting device comprising:
a substrate and
a stranded conductor,
wherein the stranded conductor includes a sleeve according to claim 1 that is mounted on the substrate, and the conductor is crimped to the sleeve.

6. The contacting device according to claim 5, wherein the sleeve is mounted on the substrate over an uncrimped part of the length.

7. The contacting device according to claim 5, wherein a metallic material of a core of the conductor and a metallic material of the substrate have an electrochemical potential difference of more than 0.3 V, and the sleeve is made of a metallic material, an electrochemical potential of which lies between that of the core of the conductor and that of the substrate, wherein the substrate is made of an aluminum material, the core of the conductor is made of a copper material and the sleeve is made of a brass material or a CuZn material.

8. A battery having a contacting device according to claim 5, wherein the substrate is made of an aluminum material.

9. A vehicle having a contacting device according to claim 5, wherein the vehicle includes a battery having the substrate that is made of an aluminum material.

10. A method for connecting a stranded electric conductor to a substrate comprising the steps of:
a) inserting the stranded electric conductor into a sleeve according to claim 1,
b) first crimping the sleeve to the conductor, thereby fastening the electric conductor in the sleeve, wherein the sleeve has a rotational symmetric form and crimping is done rotationally symmetrically, or leaves a part of the sleeve in a rotationally symmetric form, so that the sleeve can be placed on the carrier object independent of the direction of its longitudinal axis,
c) placing the conductor with the sleeve on the substrate,
d) connecting the sleeve which encompasses the conductor to the substrate by ultrasonic welding and/or by a second crimping.

11. The method according to claim 10, wherein the first crimping is carried out over only a part of a length, rather than over an entire length, and in that the connection between the sleeve and the substrate is established only in the uncrimped region of the sleeve.

12. The method according to claim 10, wherein in an uncrimped state, the sleeve has a rotationally symmetrical cross-section, and the sleeve remains rotationally symmetrically at least in sections even after crimping.

13. The sleeve according to claim 1, wherein the two layers of the sleeve comprise a first outer layer of electrically conductive material which is softer than brass, and a second inner layer made of brass; and wherein the first outer layer is welded to the substrate while the second inner layer remains intact.

14. The sleeve according to claim 13, wherein the first outer layer is made of copper.

15. The sleeve according to claim 1, wherein the two layers of different materials are hermetically sealed together so that no contact corrosion can result on contact surfaces between the two layers of different materials.

16. The sleeve according to claim 1, wherein the sleeve is mounted on the substrate by ultrasonic welding.

17. The sleeve according to claim 1, wherein the sleeve is closed at least locally a full 360° around a circumference of the stranded conductor, and the sleeve is free of seams.

18. The sleeve according to claim 1, wherein in an uncrimped state, the sleeve has a rotationally symmetrical cross-section, and the sleeve remains rotationally symmetrical at least in sections even after crimping.

19. A sleeve comprising: at least one plug-in opening for inserting a stranded conductor and having a tapered lead-in in a form of a transition at an outer end of the sleeve to initially receive insertion of the stranded conductor into the sleeve, which narrows in a form of a funnel, from an outer diameter to an inner diameter, to avoid any sharp edges that might compromise stability of the stranded conductor;
    wherein the sleeve is rotationally symmetrical;
    wherein the sleeve is made of brass, an alloy containing copper or zinc, or two layers of different materials;
    wherein the sleeve holds an end of the stranded conductor and the sleeve forms a contact that is welded to an aluminum substrate;
    wherein the sleeve is a hollow cylinder closed at least locally a full 360° around a circumference of the stranded conductor;
    wherein the sleeve is configured to be placed on the substrate, independent of its orientation relative to a longitudinal axis; and
    wherein the stranded conductor and the sleeve are compressed in more than one location along a length of the sleeve.

\* \* \* \* \*